(12) United States Patent
Kim

(10) Patent No.: US 10,018,778 B2
(45) Date of Patent: Jul. 10, 2018

(54) LIQUID CRYSTAL DISPLAY DEVICE

(71) Applicant: LG DISPLAY CO., LTD., Seoul (KR)

(72) Inventor: Minji Kim, Busan (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 15/287,226

(22) Filed: Oct. 6, 2016

(65) Prior Publication Data

US 2017/0184784 A1   Jun. 29, 2017

(30) Foreign Application Priority Data

Dec. 29, 2015   (KR) ........................ 10-2015-0189061

(51) Int. Cl.
   *G02F 1/133*    (2006.01)
   *F21V 8/00*     (2006.01)

(52) U.S. Cl.
   CPC .......... *G02B 6/0091* (2013.01); *G02B 6/002* (2013.01); *G02B 6/0055* (2013.01); *G02B 6/0088* (2013.01)

(58) Field of Classification Search
   CPC .... G02B 6/0091; G02B 6/002; G02B 6/0055; G02B 6/0088
   See application file for complete search history.

(56) References Cited

U.S. PATENT DOCUMENTS

| | | | | |
|---|---|---|---|---|
| 2010/0007814 | A1* | 1/2010 | Kim | G02B 6/0083 349/58 |
| 2012/0262634 | A1* | 10/2012 | Takano | G02B 6/0055 348/790 |
| 2013/0063680 | A1* | 3/2013 | Zhou | G09F 13/04 349/62 |
| 2013/0107157 | A1* | 5/2013 | Yang | G02F 1/133308 349/58 |
| 2015/0022760 | A1* | 1/2015 | Hsu | G02B 6/0013 349/65 |
| 2015/0268410 | A1* | 9/2015 | Yu | G02B 6/0083 349/58 |
| 2016/0187560 | A1* | 6/2016 | Matsumoto | G02F 1/133308 362/611 |
| 2017/0139099 | A1* | 5/2017 | Zeng | G02B 6/005 |

* cited by examiner

*Primary Examiner* — James Dudek
(74) *Attorney, Agent, or Firm* — Dentons US LLP

(57) ABSTRACT

Provided is a liquid crystal display device. The liquid crystal display device includes: a liquid crystal display panel; a light source under the liquid crystal display panel; a light guiding plate; a reflecting plate; a guide mold; and a supporting member. The light guiding plate is in contact with one surface of the light source. The reflecting plate is disposed under the light guiding plate. The guide mold accommodates the light source, the light guiding plate, and the reflecting plate therein. The supporting member is disposed under the reflecting plate and supports at least a part of one surface of the reflecting plate.

10 Claims, 4 Drawing Sheets

LIQUID CRYSTAL DISPLAY DEVICE

CROSS-REFERENCE TO RELATED APPLICATIONS

This application claims the priority of Korean Patent Application No. 10-2015-0189061 filed on Dec. 29, 2015, in the Korean Intellectual Property Office, the disclosure of which is incorporated herein by reference.

BACKGROUND

Field

The present disclosure relates to a liquid crystal display device and more particularly, to a liquid crystal display device which can implement uniform brightness.

Description of the Related Art

A liquid crystal display (LCD) device is a display device for displaying an image by adjusting the transmissivity of light generated from a light source. In the LCD device, the light source is disposed under a liquid crystal and an electric field is applied to the liquid crystal to control alignment of the liquid crystal. The LCD device is applied to various electronic devices such as a smartphone, and a tablet PC. Recently, studies on an LCD device including a narrow bezel to improve a degree of freedom of design and maximize an active area have been being conducted actively.

A typical LCD device includes a backlight unit including a light source and a liquid crystal display panel disposed on the backlight unit. The backlight unit includes the light source, a light guiding plate, an optical sheet, a reflecting plate, and a guide mold. The reflecting plate reflects a light generated from the light source toward the light guiding plate and improves the light efficiency of the backlight unit. Generally, the reflecting plate is manufactured in the form of a thin sheet and bonded to a back surface of the light guiding plate. However, lights emitted from the light source are reflected by the reflecting plate and then concentrated in a specific area of the LCD device, which causes non-uniformity in brightness of the LCD device. Thus, a hot spot occurs. The hot spot refers to a bright point defect having a higher brightness in a part of a screen of the LCD device than in the surrounding area. This hot spot may be referred to a general hot spot.

Further, if lights emitted from the light source are reflected by the reflecting plate and more lights are concentrated in a specific area, a search light-type hot spot occurs. In the search light-type hot spot, since more lights are straightly propagated and concentrated in a specific area without being scattered, the non-uniformity in brightness of the LCD device may be increased.

Particularly, as a thickness of a bezel of the LCD device is decreased, a distance between an active area and the light source is decreased. Therefore, lights reflected at a curved portion of the reflecting plate are more likely to meet in the active area. Thus, the non-uniformity in brightness may be magnified. Accordingly, more hot spots as bright point defects each having a higher brightness in a part of a screen of the LCD device than in the surrounding area may occur. Particularly, search light-type hot spots may occur, and, thus, the non-uniformity in brightness may be worsened.

SUMMARY

The inventors of the present disclosure recognized that a light guiding plate and a reflecting plate are not bonded to each other in a light-entry area where a light is emitted from a light source. Thus, the reflecting plate may be curved. Further, the inventors recognized that a reflection path of the light is changed due to a curve of the reflecting plate. Thus, lights are concentrated in a specific area of a liquid crystal display device. Accordingly, the inventors of the present disclosure invented a liquid crystal display device minimizing concentration of lights in a specific area by making a uniform path of light concentrated in a light-entry area by disposing a supporting member on a back surface of a reflecting plate to minimize a curve of the reflecting plate.

An object to be achieved by the present disclosure is to provide a liquid crystal display device minimizing non-uniformity in brightness of the liquid crystal display device by disposing a supporting member on a back surface of a reflecting plate.

The objects of the present disclosure are not limited to the aforementioned objects, and other objects, which are not mentioned above, will be apparent to a person having ordinary skill in the art from the following description.

According to an aspect of the present disclosure, there is provided a liquid crystal display device. The liquid crystal display device includes: a liquid crystal display panel; a light source under the liquid crystal display panel; a light guiding plate; a reflecting plate; a guide mold; and a supporting member. The light guiding plate is in contact with one surface of the light source. The reflecting plate is disposed under the light guiding plate. The guide mold accommodates the light source, the light guiding plate, and the reflecting plate therein. The supporting member is disposed under the reflecting plate and supports at least a part of one surface of the reflecting plate. The liquid crystal display device according to an exemplary embodiment of the present disclosure includes the supporting member which is under the reflecting plate and supports at least a part of one surface of the reflecting plate. Thus, a curve of the reflecting plate can be minimized. Therefore, it is possible to minimize non-uniformity in brightness of the liquid crystal display device caused by concentration of lights, which are reflected at a curved portion of the reflecting plate, in a specific area.

According to another aspect of the present disclosure, there is provided a liquid crystal display device. The liquid crystal display device includes: a liquid crystal display panel, and a backlight unit under the liquid crystal display panel. The backlight unit includes a light source, a light guiding plate, a reflecting plate, and a supporting member. The light guiding plate is configured to change a path of a light emitted from the light source. The reflecting plate is under the light guiding plate and configured to reflect a light. The supporting member flattens an upper surface of the reflecting plate to minimize concentration of a light, which is emitted from the light source and reflected by the reflecting plate, in a specific area of the liquid crystal display panel.

Details of other exemplary embodiments will be included in the detailed description of the disclosure and the accompanying drawings.

According to an embodiment of the present disclosure, the supporting member is provided to flatten the upper surface of the reflecting plate in a light-entry area where a light is emitted from the light source. Thus, a curve of the reflecting plate can be minimized and concentration of lights caused by the curve of the reflecting plate can be suppressed. Therefore, it is possible to improve uniformity in brightness of the liquid crystal display device.

According to an embodiment of the present disclosure, the supporting member is configured to suppress concentration of lights, which are emitted from the light source, in a specific area. Therefore, it is possible to improve a general hot spot or a search light-type hot spot caused by non-uniformity in brightness of the liquid crystal display device.

The effects of the present disclosure are not limited to the aforementioned effects, and various other effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
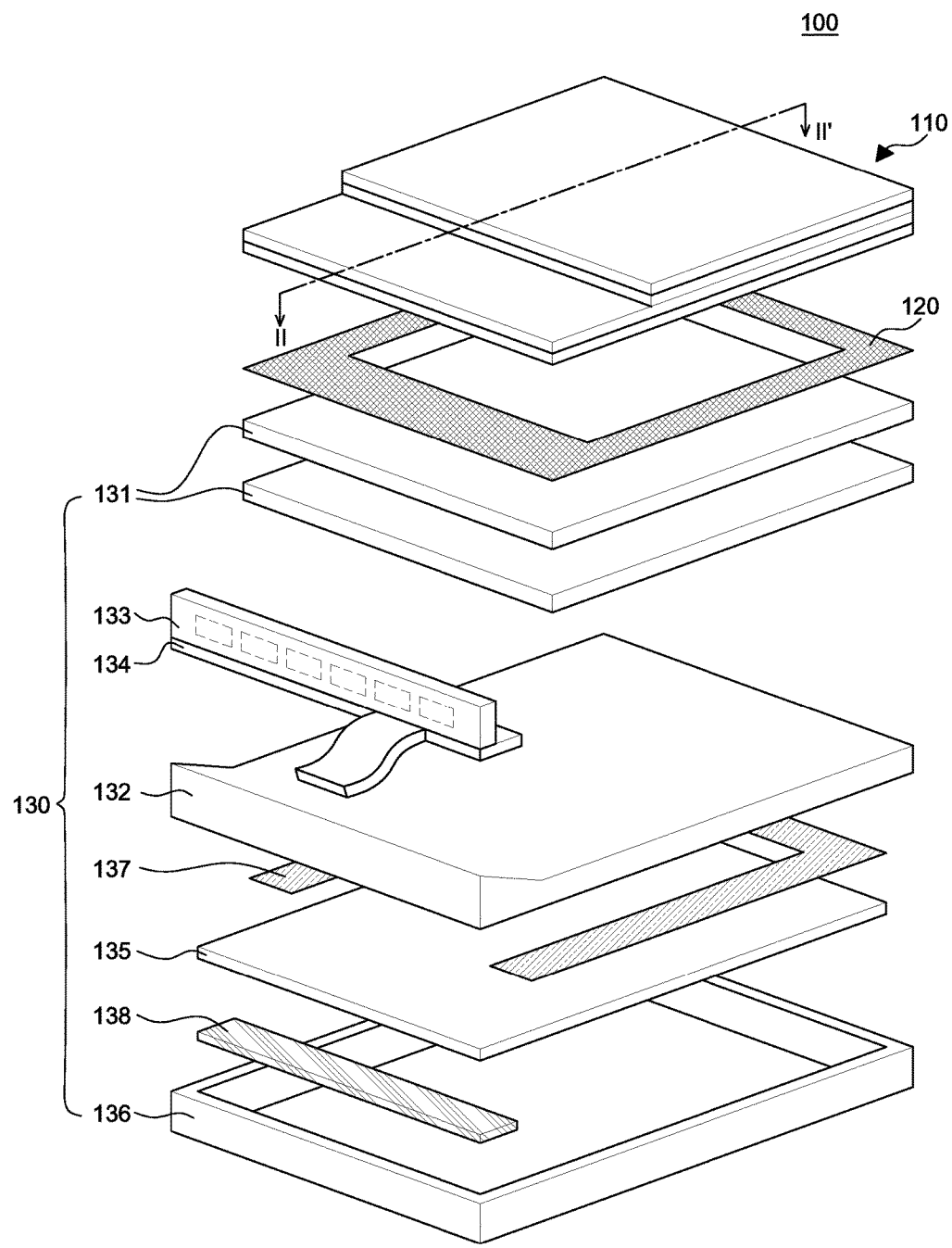
FIG. 1 is a schematic exploded perspective view of a liquid crystal display device according to an exemplary embodiment of the present disclosure.

Advantages and features of the present disclosure, and methods for accomplishing the same will be more clearly understood from exemplary embodiments described below with reference to the accompanying drawings. However, the present disclosure is not limited to the following exemplary embodiments but may be implemented in various different forms. The exemplary embodiments are provided only to complete disclosure of the present disclosure and to fully provide a person having ordinary skill in the art to which the present disclosure pertains with the category of the disclosure, and the present disclosure will be defined by the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the present specification. Further, in the following description, a detailed explanation of well-known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", "next" and the like, one or more parts may be positioned between the two parts unless the terms are used with the term "immediately" or "directly".

When an element or layer is referred to as being "on" another element or layer, it may be directly on the other element or layer, or intervening elements or layers may be present.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Throughout the whole specification, the same reference numerals denote the same elements.

Since size and thickness of each component illustrated in the drawings are represented for convenience in explanation, the present disclosure is not necessarily limited to the illustrated size and thickness of each component.

The features of various embodiments of the present disclosure can be partially or entirely bonded to or combined with each other and can be interlocked and operated in technically various ways, and the embodiments can be carried out independently of or in association with each other.

Hereinafter, various exemplary embodiments of the present disclosure will be described in detail with reference to the accompanying drawings.

Figure 2:
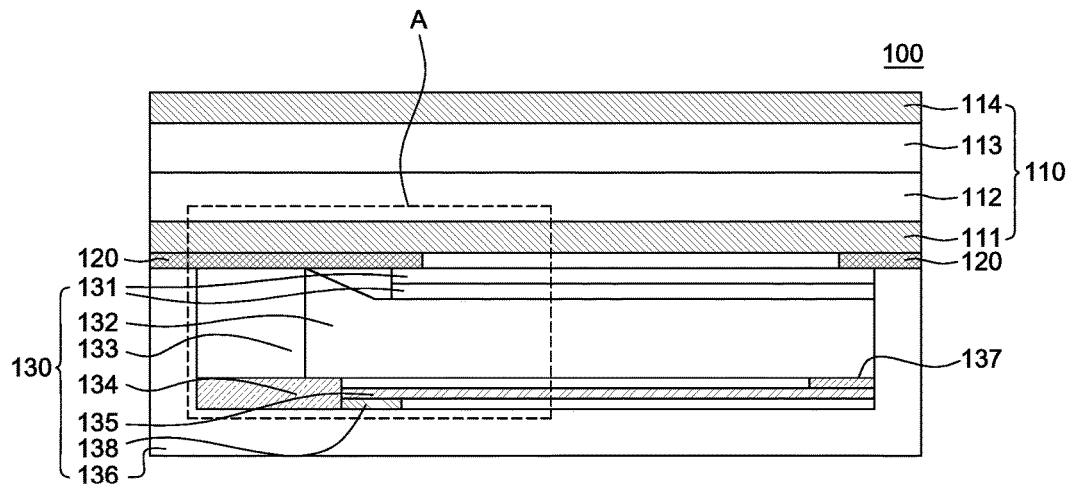
FIG. 2 is a schematic cross-sectional view taken along a line II-II' of FIG. 1.

FIG. 1 is a schematic exploded perspective view of a liquid crystal display device according to an exemplary embodiment of the present disclosure. FIG. 2 is a schematic cross-sectional view taken along a line II-II' of FIG. 1. Referring to FIG. 1 and FIG. 2, a liquid crystal display device 100 includes a liquid crystal display panel 110, a ring tape 120, and a backlight unit 130.

Referring to FIG. 1 and FIG. 2, the liquid crystal display panel 110 is disposed on the backlight unit 130. The liquid crystal display panel 110 includes an active area where an image is displayed and a bezel area surrounding the active area.

The liquid crystal display panel 110 includes a lower polarizing plate 111, a lower substrate 112, an upper substrate 113, and an upper polarizing plate 114. The lower polarizing plate 111 is configured to polarize a light emitted from the backlight unit 130 to supply the light to the lower substrate 112. The light supplied to the lower substrate 112 passes through a liquid crystal disposed between the lower substrate 112 and the upper substrate 113 and propagates toward the upper polarizing plate 114.

The liquid crystal, a pixel electrode, a common electrode, a transistor, and a capacitor are disposed between the lower substrate 112 and the upper substrate 113. The transistor is configured to form an electric field between the pixel electrode and the common electrode on the basis of a data driving signal and a gate driving signal. Alignment of the liquid crystal is changed on the basis of the electric field between the pixel electrode and the common electrode. The transmittance of a light penetrating the liquid crystal is controlled by changing the alignment of the liquid crystal.

The upper substrate 113 includes a color filter. A light penetrating the liquid crystal has a specific color by passing through the color filter of the upper substrate 113. The light passing through the upper substrate 113 is upwardly emitted through the upper polarizing plate 114, and an image is displayed on the liquid crystal display panel 110.

As illustrated in FIG. 1, the ring tape 120 is disposed between the liquid crystal display panel 110 and the backlight unit 130 and bonds the liquid crystal display panel 110 and the backlight unit 130. The ring tape 120 is disposed corresponding to the bezel area of the liquid crystal display panel 110 in order to minimize a decrease in visibility of the liquid crystal display device 100. The ring tape 120 may be formed as a double-sided tape having high light absorption in order to minimize leakage of a light emitted from the backlight unit 130 to the outside.

In some exemplary embodiments, the ring tape 120 may be omitted. That is, the liquid crystal display panel 110 and the backlight unit 130 may be bonded to each other with a light-absorbing resin. The light-absorbing resin may bond a lateral surface of the liquid crystal display panel 110 and a lateral surface of the backlight unit 130.

The backlight unit 130 supplies a light to the liquid crystal display panel 110 and is disposed under the liquid crystal display panel 110. The backlight unit 130 includes an optical sheet 131, a light guiding plate 132, a light source 133, a flexible printed circuit board (FPCB) 134, a reflecting plate 135, a bonding member 137, a supporting member 138, and a guide mold 136.

The guide mold 136 accommodates the optical sheet 131, the light guiding plate 132, the light source 133, the FPCB 134, the reflecting plate 135, the bonding member 137, and the supporting member 138 therein, and constitutes the exterior of the backlight unit 130. The guide mold 136 has an open-top box shape and the above-described components are accommodated within the guide mold 136 as illustrated in FIG. 1. The guide mold 136 may be formed of plastic which is easy to mold. For example, the guide mold 136 may have a dual structure including an outer mold formed of black plastic having high light absorption and an inner mold formed of white plastic having high reflectivity, but is not limited thereto. The guide mold 136 may have various colors, various structures, and various shapes.

The light source 133 and the FPCB 134 are disposed along one lateral surface of the guide mold 136. If the light source 133 is disposed along one lateral surface of the guide mold 136, a light is emitted along the one lateral surface of the guide mold 136. The light source 133 described above may be referred to as an edge-type light source. The light source 133 may include a plurality of light emission diodes (LEDs), but is not limited thereto. The light source 133 may include various light emission elements such as a cold cathode fluorescent lamp (CCFL), an external electrode fluorescent lamp (EEFL), or a quantum dot (QD) light emission diode. The light source 133 generates a white light. For example, the light source 133 may be formed into a package including a blue light emission diode that generates a blue light and a yellow fluorescent material, but is not limited thereto. The light source 133 may be formed into a package including a blue light emission diode, a red light emission diode, and a green light emission diode.

The FPCB 134 is connected to the light source 133 and supplies an electric signal in order for the light source 133 to emit a light. The FPCB 134 and the light source 133 may be connected to a printed circuit board (PCB) disposed under the backlight unit 130, and the light source 133 may operate on the basis of a driving signal transferred from circuits disposed on the PCB.

As illustrated in FIG. 2, the light guiding plate 132 is in contact with one surface of the light source 133. Further, the light guiding plate 132 diffuses or collects a light emitted from the light source 133 so as to be propagated toward the lower polarizing plate 111 of the liquid crystal display panel 110. The light guiding plate 132 may have a flat plate shape as illustrated in FIG. 2, or may have a wedge shape.

The optical sheet 131 is disposed on the light guiding plate 132 and improves the brightness of a light generated from the light source 133. The optical sheet 131 may include a plurality of sheets including a diffusion sheet and a prism sheet.

The reflecting plate 135 reflects a light generated from the light source 133. The light reflected by the reflecting plate 135 may be incident into the lower polarizing plate 111 of the liquid crystal display panel 110 through the light guiding plate 132 and the optical sheet 131. The reflecting plate 135 is formed into a film and formed of various materials having high reflectivity. For example, the reflecting plate 135 may be formed into a thin film having a thickness of about 100 µm to about 200 µm and including a metallic reflective material.

The reflecting plate 135 is bonded to a back surface of the light guiding plate 132. As illustrated in FIG. 1, the bonding member 137 is bonded to the back surface of the light guiding plate 132 so as to correspond to a three-sided edge of the light guiding plate 132. Further, the reflecting plate 135 is bonded to the back surface of the light guiding plate 132 through the bonding member 137.

The bonding member 137 is formed as a transparent double-sided tape. Although the bonding member 137 has transparency, a light may be irregularly reflected at an interface between the bonding member 137 and the light guiding plate 132. Therefore, the bonding member 137 is disposed along an outer periphery of the active area where an image is displayed. Meanwhile, the bonding member 137 is not disposed in a light-entry area where a light from the light source 133 is incident into the light guiding plate 132.

Herein, the light-entry area means an area adjacent to the light source 133 and also means an area where a light emitted from the light source 133 is diffused. The light-entry area generally means an area within a specific distance from the light source 133 that emits a light. Details of the light-entry area will be described later with reference to FIG. 3.

If the bonding member 137 is disposed in the light-entry area, a light is irregularly reflected at the interface between the bonding member 137 and the light guiding plate 132. Thus, a shape of the bonding member 137 may be seen as a spot (e.g., mura). Therefore, the bonding member 137 is not disposed on one lateral surface of the light guiding plate 132 corresponding to the light-entry area in order to minimize irregular reflection at the light-entry area. Accordingly, the bonding member 137 is disposed in the other area except the active area and the light-entry area where a light is emitted from the light source 133 in order to minimize a decrease in visibility of the display device 100 caused by the bonding member 137.

Meanwhile, the reflecting plate 135 is spaced away from the guide mold 136. As described above, the light source 133 and the FPCB 134 are disposed along the one lateral surface of the guide mold 136. Since the FPCB 134 is disposed under the light source 133, the FPCB 134 is disposed to be in contact with the inner bottom of the guide mold 136. Meanwhile, the light guiding plate 132 is placed as close as possible to the light source 133 in order to receive a light emitted from the light source 133 as much as possible. Thus, one surface of the light guiding plate 132 and one surface of the light source 133 are in contact with each other, and the light guiding plate 132 is disposed over the FPCB 134. The reflecting plate 135 is bonded to the back surface of the light guiding plate 132. Since the FPCB 134 has a greater thickness than the reflecting plate 135, a space is formed between the reflecting plate 135 and the guide mold 136 due to the thickness of the FPCB 134.

In some exemplary embodiments, additional components may be disposed on the inner bottom of the guide mold 136. For example, a sensing pad for sensing a force of a touch input of a user to the display device 100 may be disposed on the inner bottom of the guide mold 136. In this case, a space may be formed between the inner bottom of the guide mold 136 and the reflecting plate 135 with the intention to secure a physical space for the sensing pad.

The supporting member 138 is disposed under the reflecting plate 135 and supports at least a part of one surface of the reflecting plate 135. Specifically, the supporting member 138 supports one surface of the reflecting plate 135 in the light-entry area where a light is emitted from the light source 133. As illustrated in FIG. 2, the supporting member 138 fills the space between the guide mold 136 and the reflecting plate 135 and bonds the reflecting plate 135 and the guide mold 136. The supporting member 138 may be formed as a double-sided tape in order to bond the guide mold 136 and the reflecting plate 135 to each other.

In some exemplary embodiments, an additional structure may be disposed on a back surface of the guide mold 136, and the supporting member 138 may be disposed on the additional structure to support one surface of the reflecting plate 135.

The supporting member 138 flattens the one surface of the reflecting plate 135. Since the one surface of the reflecting plate 135 is flattened, a distance between the reflecting plate 135 and the light guiding plate 132 becomes uniform. In this case, it is possible to minimize a phenomenon in which a light reflected at one area of the reflecting plate 135 and a light reflected at another area meet each other and are concentrated in a specific area. Such a principle will be described in more detail with reference to FIG. 3.

Figure 3:
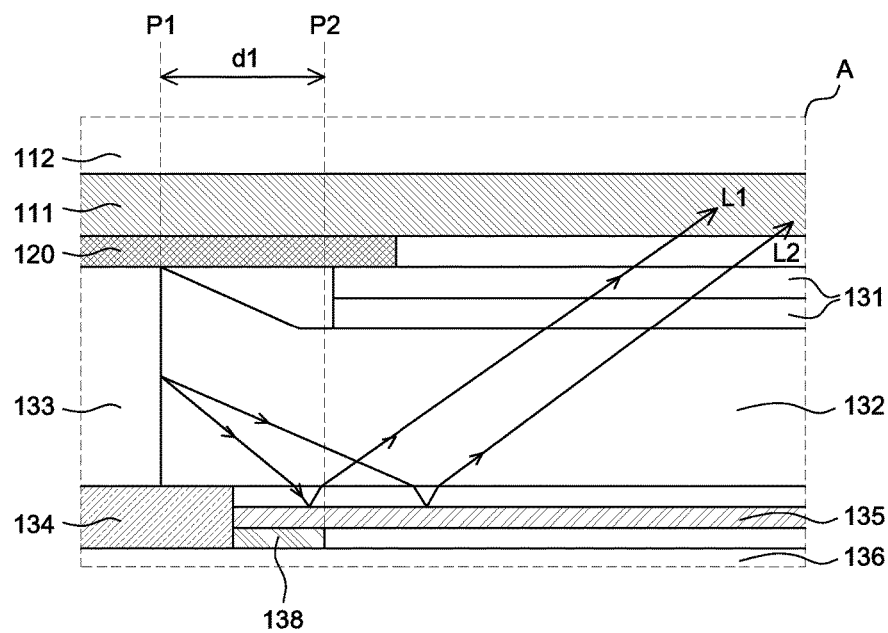
FIG. 3 is a partially enlarged cross-sectional view of a portion A of the liquid crystal display device illustrated in FIG. 2.

FIG. 3 is a schematic cross-sectional view provided to explain a principle of minimizing non-uniformity in brightness of a liquid crystal display device according to an exemplary embodiment of the present disclosure. Referring to FIG. 3, an upper surface of the reflecting plate 135 is flattened by the supporting member 138 in the light-entry area where a light is emitted from the light source 133.

Herein, the light-entry area means an area where a light emitted from the light source 133 is diffused. Specifically, the light-entry area means an area within a predetermined distance from the light source 133. If the light source 133 is of edge type, a light is emitted from one surface on which the light source 133 is disposed. Therefore, the light-entry area means an area between one surface P1 of the light source 133 and an interface P2 spaced away from the one surface P1 at a specific distance. FIG. 3 illustrates the interface P2 spaced away from the one surface P1 of the light source 133 at a first distance d1. The first distance d1 that determines a size of the light-entry area may be determined differently depending on a kind of the light source 133, a size of the light source 133, and a distance between the light sources 133. For example, the first distance d1 may be defined as 0.75 mm, but is not limited thereto.

A light may not be sufficiently diffused in the light-entry area as compared with the other areas. Thus, various optical problems occur in the light-entry area. For example, lights from the light source 133 may not be sufficiently diffused in the light-entry area. Thus, there may be difference in light distribution between the areas. Specifically, a light is radially emitted from the light source 133. The light emitted from the light source 133 is diffused in a cone shape and may meet another light which is emitted from another adjacent light source 133 and diffused in a cone shape. In this case, an area where the two cones intersect with each other has a great amount of light and becomes a bright portion. Further, an area where the two cones do not intersect with each other has a small amount of light and becomes a dark portion. In an area far from the light source 133, lights from the light source 133 are uniformly distributed. Therefore, a bright portion and a dark portion are not generated. However, in the light-entry area adjacent to the light source 133, the lights are not sufficiently distributed. Therefore, the lights may be concentrated or insufficient in a specific area, so that a bright portion and a dark portion are generated.

The generation of the bright portion and the dark portion in the light-entry area may be suppressed by the light guiding plate 132. For example, the light guiding plate 132 may be formed to have a slope in the light-entry area. In this case, a light may be reflected at the slope of the light guiding plate 132, and, thus, the light can be intentionally incident into the dark portion insufficient in light. Accordingly, a difference in brightness between the dark portion and the bright portion can be reduced, and the backlight unit 130 can uniformly supply a light to the display panel 110.

Meanwhile, as described above, the bonding member 137 is not disposed in the light-entry area, and, thus, the reflecting plate 135 and the light guiding plate 132 are not bonded to each other in the light-entry area. Since the reflecting plate 135 is formed into a thin film, the reflecting plate 135 may be curved in the light-entry area where the bonding member 137 is not disposed. If the reflecting plate 135 is curved, a distance between the reflecting plate 135 and the light guiding plate 132 may become non-uniform and a propagation path of a light reflected by the reflecting plate 135 may be changed. Details thereof will be described with reference to FIG. 4.

Figure 4:
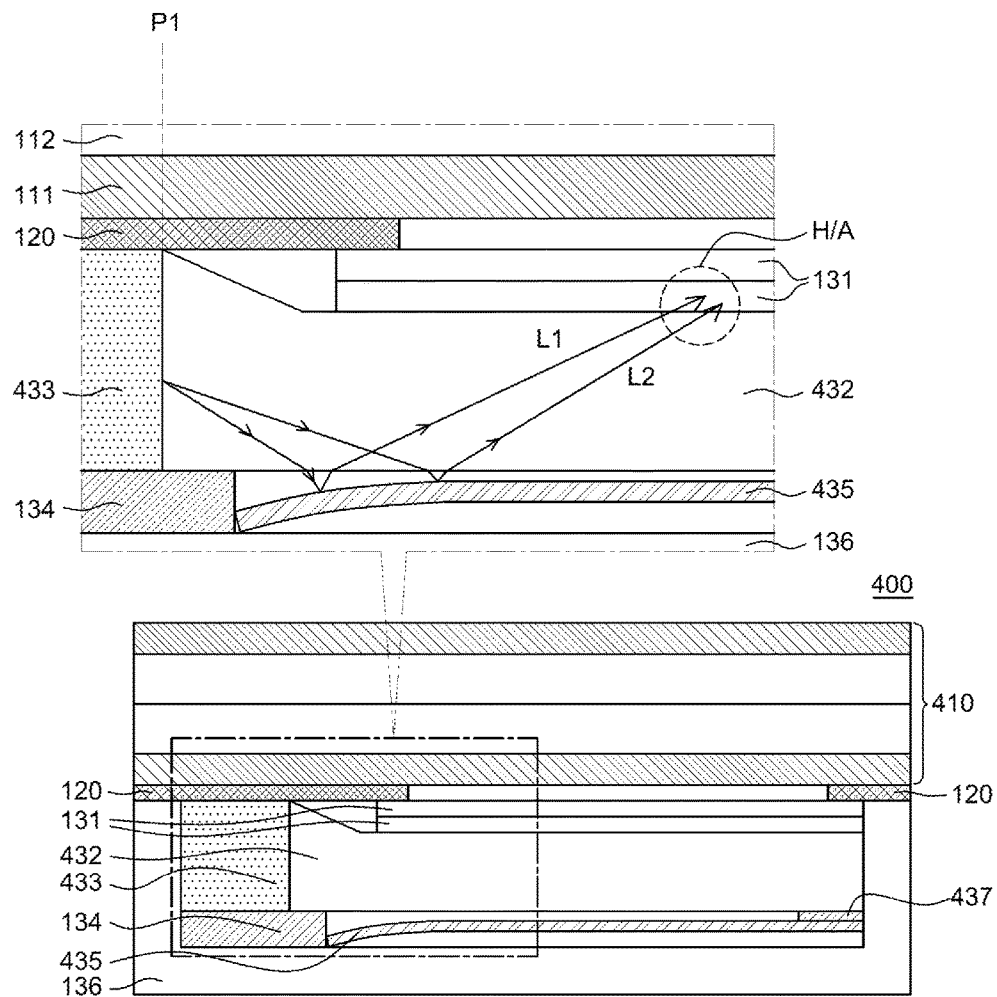
FIG. 4 is a schematic cross-sectional view of a liquid crystal display device according to Comparative Example provided to explain a principle of minimizing non-uniformity in brightness of a liquid crystal display device according to an exemplary embodiment of the present disclosure.

FIG. 4 is a schematic cross-sectional view of a liquid crystal display device according to Comparative Example provided to explain a principle of minimizing non-uniformity in brightness of a liquid crystal display device according to an exemplary embodiment of the present disclosure. In the following, redundant explanation of the components described with reference to the liquid crystal display device 100 according to an exemplary embodiment of the present disclosure will be omitted.

Referring to FIG. 4, if there is no supporting member, a reflecting plate 435 may be curved in a specific area. A bonding member 437 is not disposed on one surface of a light guiding plate 432, and, thus, the reflecting plate 435 is not bonded to the light guiding plate 432 in a light-entry area where a light is emitted from a light source 433. Therefore, as illustrated in FIG. 4, the reflecting plate 435 in the form of a thin sheet may be curved in the light-entry area. A reflection path of a light may be locally changed in the light-entry area due to the curve of the reflecting plate 435, and lights may be concentrated in a specific area.

Specifically, a light generated from the light source 433 is radially emitted from the light source 433. As illustrated in FIG. 4, a first light L1 among lights generated from the light source 433 may be incident into a curved portion of the reflecting plate 435. In this case, the first light L1 is refracted in a space between the reflecting plate 435 and the light guiding plate 432 and reflected at the curved portion of the reflecting plate 435 so as to be incident into a back surface of the light guiding plate 432. The first light L1 incident into the light guiding plate 432 may propagate along a specific path and may be emitted to a specific area in a liquid crystal display panel 410. Meanwhile, a second light L2 among the light generated from the light source 433 may be incident into a non-curved portion of the reflecting plate 435. In this case, the second light L2 is refracted in the space between the reflecting plate 435 and the light guiding plate 432 and reflected at the non-curved portion of the reflecting plate 435. The reflected second light L2 may incident into the back surface of the light guiding plate 432. The second light L2 incident into the light guiding plate 432 may propagate along a specific path and may be emitted to the specific area in a liquid crystal display panel 410.

A distance between the light guiding plate 432 and the reflecting plate 435 in the curved portion of the reflecting plate 435 is greater than a distance between the light guiding plate 432 and the reflecting plate 435 in the non-curved portion of the reflecting plate 435. Therefore, a propagation path of the first light L1 and a propagation path of the second light L2 may be different from each other. In this case, the first light L1 and the second light L2 may be concentrated in a specific area H/A. Further, the specific area H/A in the liquid crystal display panel 410 may be brighter than the other areas due to the concentration of lights. Particularly, the concentration of lights may occur intensively in the light-entry area where a light is emitted from the light source 433, and, thus, the brightness of a liquid crystal display device 400 may become non-uniform.

Specifically, the first light L1 and the second light L2 may meet each other and propagate along the same path in the liquid crystal display panel 410. For example, both the first light L1 and the second light L2 may pass through a red color filter of the liquid crystal display panel 410. Meanwhile, a third light emitted from the light source 433 and incident into the liquid crystal display panel 410 may pass through a blue color filter adjacent to the red color filter. In this case, only one light, i.e., the third light, passes through the blue color filter, but two lights, i.e., the first light L1 and the second light L2, pass through the red color filter. Therefore, the amount of light passing through the red color filter is greater than the amount of light passing through the blue color filter relatively. Accordingly, the specific area H/A in the liquid crystal display device may tend slightly to have a red color, and a micro red spot may be seen in the specific area H/A. As a result, the brightness of the liquid crystal display device may become non-uniform.

Particularly, if the reflecting plate 435 is curved in a bright portion of the light-entry area, the non-uniformity in brightness of the liquid crystal display device may be worsened due to concentration of lights. Specifically, the light-entry area refers to an area where a light emitted from the light source 433 is diffused and thus has a relatively high light density. Particularly, the bright portion of the light-entry area refers to an area where lights emitted from two adjacent light sources 433 are concentrated and thus has a relatively high light density. If the reflecting plate 435 is curved in the bright portion of the light-entry area and lights are concentrated in a specific area due to the curved reflecting plate 435, the non-uniformity in brightness of the liquid crystal display device 400 may be magnified in the specific area.

However, in the liquid crystal display device 100 according to an exemplary embodiment of the present disclosure, the non-uniformity in brightness can be minimized. Referring to FIG. 3 again, the liquid crystal display device 100 according to an exemplary embodiment of the present disclosure includes the supporting member 138 configured to support at least a part of one surface of the reflecting plate 135 in the light-entry area. The supporting member 138 flattens the upper surface of the reflecting plate 135 and minimizes concentration of lights, which are emitted from the light source 133 and reflected by the reflecting plate 135, in a specific area.

Specifically, the upper surface of the reflecting plate 135 is flattened by the supporting member 138 in the light-entry area. That is, an upper surface of the supporting member 138 is substantially flat in the light-entry area and lights emitted from the light source 133 may not be concentrated. For example, a first light L1 emitted from the light source 133 is incident into the light guiding plate 132. The first light L1 propagates to the back surface of the light guiding plate 132 in the light-entry area and is refracted in a space between the light guiding plate 132 and the reflecting plate 135. The space between the light guiding plate 132 and the reflecting plate 135 is formed by the bonding member 137. That is, the bonding member 137 bonds the light guiding plate 132 and the reflecting plate 135 at the three-sided edge of the light guiding plate 132. Thus, the light guiding plate 132 and the reflecting plate 135 are spaced away from each other in an area where the bonding member 137 is not disposed. The first light L1 passing through the space between the light guiding plate 132 and the reflecting plate 135 is reflected by the upper surface of the reflecting plate 135 in the light-entry area and then incident into the back surface of the light guiding plate 132. The first light L1 incident into the back surface of the light guiding plate 132 may be refracted again toward the upper surface of the reflecting plate 135 and then incident into the liquid crystal display panel 110 through the optical sheet 131.

Meanwhile, a second light L2 emitted from the light source 133 is incident into the light guiding plate 132. The second light L2 propagates toward the back surface of the light guiding plate 132 and is reflected by the reflecting plate 135 in any area other than the light-entry area. The second light L2 reflected by the reflecting plate 135 is incident into the back surface of the light guiding plate 132, and propagates along a straight path in the light guiding plate 132 so as to be incident into the liquid crystal display panel 110 through the optical sheet 131.

The supporting member 138 is disposed in a space between the one surface P1 of the light source 133 and the interface P2 spaced away from the one surface P1 at the first distance d1. That is, the supporting member 138 flattens the upper surface of the reflecting plate 135 in the light-entry area. As described above, the bonding member 137 is not disposed in the light-entry area, and, thus, the reflecting plate 135 is likely to be curved in the light-entry area. Further, the light-entry area refers to an area where a light is not sufficiently diffused and thus has a higher light density than the other areas. An effect of the curved reflecting plate 135 is greater in the light-entry area than in the other areas. However, the liquid crystal display device 100 according to an exemplary embodiment of the present disclosure includes the supporting member 138 disposed in the light-entry area. Thus, a curve of the reflecting plate 135 in the light-entry area can be minimized, and the non-uniformity in brightness of the liquid crystal display device 100 caused by the curve of the reflecting plate 135 can also be minimized. Therefore, it is possible to improve a general hot spot or a search light-type hot spot in the liquid crystal display device 100.

A distance between the reflecting plate 135 and the light guiding plate 132 can be uniformly maintained by the supporting member 138. For example, the supporting member 138 may fill a space between the guide mold 136 and a back surface of the reflecting plate 135 in order to flatten the upper surface of the reflecting plate 135, but is not limited thereto. The supporting member 138 may uniformly maintain the distance between the light guiding plate 132 and the reflecting plate 135 in the light-entry area only. In this case, the upper surface of the reflecting plate 135 may be curved in any area other than the light-entry area, but a light is sufficiently diffused in the area other than the light-entry area. Therefore, the curve of the reflecting plate 135 may not cause a big problem.

Figure 5:
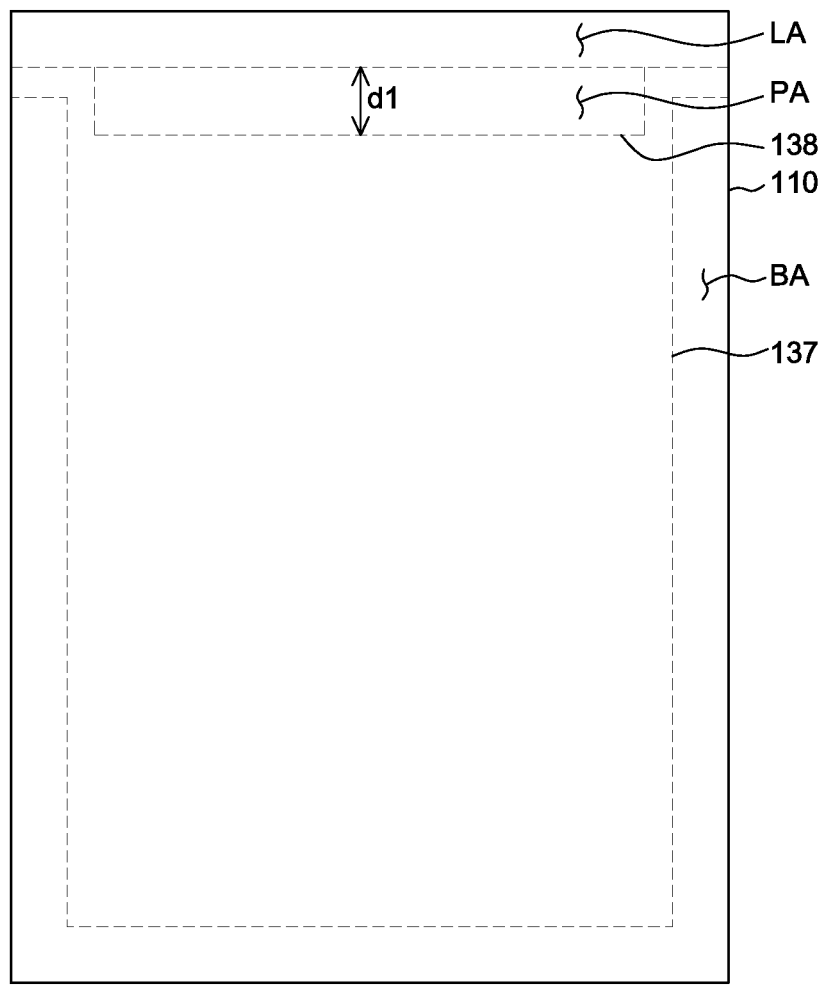
FIG. 5 is a schematic plane view of a liquid crystal display device according to an exemplary embodiment of the present disclosure.

FIG. 5 is a schematic plane view of a liquid crystal display device according to an exemplary embodiment of the present disclosure. Referring to FIG. 5, the supporting member 138 is disposed in the light-entry area where the bonding member 137 is not disposed. Specifically, the edge-type light source 133 is disposed in an upper area of the liquid crystal display panel 110. For convenience in explanation, the upper area where the light source 133 is disposed is defined as a light source area LA.

The bonding member 137 is disposed on the back surface of the light guiding plate 132 along the three-sided edge of the light guiding plate 132 in order to bond the light guiding plate 132 and the reflecting plate 135. As illustrated in FIG. 5, the three-sided edge of the light guiding plate 132 corresponds to a three-sided edge area of the liquid crystal display panel 110. For convenience in explanation, the three-sided edge area where the bonding member 137 is disposed is defined as a bonding area BA.

The supporting member 138 is disposed in any area other than the bonding area BA where the bonding member 137 is disposed and adjacent to the light source area LA. That is, the supporting member 138 is disposed in the light-entry area. Since the upper surface of the reflecting plate 135 is flattened by the supporting member 138, the area where the supporting member 138 is disposed is defined as a flattening area PA. The supporting member 138 flattens the upper surface of the reflecting plate 135 in the space between the one surface P1 of the light source 133 where the light source 133 is in contact with the light guiding plate 132 and the interface P2 spaced away from the one surface P1 at the first distance d1. That is, as illustrated in FIG. 5, a distance from one surface of the light source area LA to one interface of the flattening area PA corresponds to the first distance d1. The supporting member 138 can flatten the upper surface of the reflecting plate 135 in any area other than the light-entry area. Thus, the first distance d1 may be greater than a distance that defines the light-entry area. For example, the first distance d1 may be greater than 0.75 mm. In this case, the supporting member 138 may flatten the upper surface of the reflecting plate 135 in the light-entry area.

In some exemplary embodiments, the supporting member 138 may be disposed to be in contact with the entire back surface of the reflecting plate 135. In this case, a front surface of the reflecting plate 135 can be flattened, and, thus, the non-uniformity in brightness of the liquid crystal display device 100 can be minimized. Therefore, it is possible to improve a general hot spot or a search light-type hot spot in the liquid crystal display device 100. However, in this case, the supporting member 138 is formed to be in contact with the entire back surface of the reflecting plate 135. Thus, a great amount of a material for the supporting member 138 may be required and another structure may not be inserted between the guide mold 136 and the reflecting plate 135.

As a result, the liquid crystal display device 100 according to an exemplary embodiment of the present disclosure includes the supporting member 138 bonded under the reflecting plate 135 and supporting at least a part of one surface of the reflecting plate 135. The supporting member 138 flattens the upper surface of the reflecting plate 135 in order to minimize concentration of lights, which are emitted from the light source 133 and reflected by the reflecting plate 135, in a specific area. Particularly, the reflecting plate 135 is not bonded to the light guiding plate 132 in the light-entry area, and, thus, the reflecting plate 135 is likely to be curved. A propagation path of a light is changed due to the curve of the reflecting plate 135, and, thus, lights may be concentrated in a specific area. As described above, the light-entry area refers to an area where a light emitted from the light source 133 is not sufficiently diffused. Thus, the curve of the reflecting plate 135 in the light-entry area may greatly affect a color quality of the liquid crystal display device 100. However, the supporting member 138 of the liquid crystal display device 100 according to an exemplary embodiment of the present disclosure is disposed in the light-entry area and minimizes a curve of the reflecting plate 135. Therefore, it is possible to minimize concentration of lights, which are not diffused but reflected in the light-entry area, in a specific area. Accordingly, the brightness of the liquid crystal display device 100 can be improved and the image quality of the liquid crystal display device 100 can be improved.

The exemplary embodiments of the present disclosure can also be described as follows:

According to an aspect of the present disclosure, a liquid crystal display device includes: a liquid crystal display panel; a light source under the liquid crystal display panel; a light guiding plate; a reflecting plate; a guide mold; and a supporting member. The light guiding plate is in contact with one surface of the light source. The reflecting plate is disposed under the light guiding plate. The guide mold accommodates the light source, the light guiding plate, and the reflecting plate therein. The supporting member is disposed under the reflecting plate and supports at least a part of one surface of the reflecting plate. The liquid crystal display device according to an exemplary embodiment of the present disclosure includes the supporting member which is under the reflecting plate and supports at least a part of one surface of the reflecting plate. Thus, a curve of the reflecting plate can be minimized. Therefore, it is possible to minimize non-uniformity in brightness of the liquid crystal display device caused by concentration of lights, which are reflected at a curved portion of the reflecting plate, in a specific area.

The light source may be disposed along one lateral surface of the guide mold. The supporting member may be in a space between the one surface of the light source and an interface spaced away from the one surface of the light source at a first distance and may support the one surface of the reflecting plate.

The first distance may be greater than 0.75 mm.

The supporting member may bond the reflecting plate to the guide mold.

The liquid crystal display device further includes: a flexible printed circuit board which is connected to the light source and in contact with one surface of the guide mold. The reflecting plate may be spaced away from the one surface of the guide mold.

The liquid crystal display device further includes: a bonding member which bonds the reflecting plate to the light guiding plate. The supporting member may be disposed in any area other than an area where the bonding member is disposed.

A distance between the reflecting plate and the light guiding plate may be uniform in the area where the supporting member is disposed.

According to an aspect of the present disclosure, a liquid crystal display device includes: a liquid crystal display panel; and a backlight unit under the liquid crystal display panel. The backlight unit includes a light source, a light guiding plate, a reflecting plate, and a supporting member. The light guiding plate is configured to change a path of a light emitted from the light source. The reflecting plate is under the light guiding plate and configured to reflect a light. The supporting member flattens an upper surface of the reflecting plate to minimize concentration of a light, which is emitted from the light source and reflected by the reflecting plate, in a specific area of the liquid crystal display panel.

The supporting member may be configured to flatten an upper surface of the reflecting plate within the specific area from one surface of the light source that emits a light.

The reflecting plate and the light guiding plate may be bonded to each other in any area other than the specific area. The supporting member may be configured to minimize a curve of the reflecting plate in the specific area.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A liquid crystal display device comprising:
   a light source under a liquid crystal display panel;
   a light guiding plate in contact with one surface of the light source;
   a reflecting plate under the light guiding plate;
   a guide mold that accommodates the light source, the light guiding plate, and the reflecting plate therein;
   a bonding member, positioned between the light guiding plate and the reflecting plate, configured to form a gap between the light guiding plate and the reflecting plate, wherein the bonding member is excluded in a light-entry area where a light is configured to be emitted from the light source; and
   a supporting member is positioned under the reflecting plate and is disposed in the light-entry area, and the supporting member is configured to support at least a part of one surface of the reflecting plate.

2. The liquid crystal display device according to claim 1, wherein the light source is disposed along one lateral surface of the guide mold, and
   the supporting member is in a space between the one surface of the light source and an interface spaced away from the one surface of the light source at a first distance and supports the one surface of the reflecting plate.

3. The liquid crystal display device according to claim 2, wherein the first distance is greater than 0.75 mm.

4. The liquid crystal display device according to claim 1, wherein the supporting member bonds the reflecting plate to the guide mold.

5. The liquid crystal display device according to claim 1, further comprising:
   a flexible printed circuit board which is connected to the light source and in contact with one surface of the guide mold,
   wherein the reflecting plate is spaced away from the one surface of the guide mold.

6. The liquid crystal display device according to claim 5, wherein the bonding member bonds the reflecting plate to the light guiding plate, and
   wherein the bonding member is disposed on a back surface of the light guiding plate along three-sided edges of the light guiding plate.

7. The liquid crystal display device according to claim 6, wherein a distance between the reflecting plate and the light guiding plate is uniform in the area where the supporting member is disposed.

8. A liquid crystal display device comprising:
   a light source under a liquid crystal display panel;
   a light guiding plate configured to change a path of a light emitted from the light source;
   a reflecting plate which is under the light guiding plate and configured to reflect a light;
   a bonding member positioned between the light guiding plate and the reflecting plate so as to form a gap between the light guiding plate and the reflecting plate; and
   a supporting member which flattens an upper surface of the reflecting plate to minimize concentration of a light, which is emitted from the light source and reflected by the reflecting plate, in a specific area of the liquid crystal display panel,
   wherein the bonding member is positioned in other area except a light-entry area where a light is emitted from the light source and
   wherein the supporting member is positioned in the light-entry area.

9. The liquid crystal display device according to claim 8, wherein the supporting member is configured to flatten the upper surface of the reflecting plate within the specific area from the one surface of the light source that emits a light.

10. The liquid crystal display device according to claim 9, wherein the reflecting plate and the light guiding plate are bonded to each other by the bonding member in any area other than the specific area, and
    the supporting member is configured to minimize a curve of the reflecting plate in the specific area.

* * * * *